(12) United States Patent
Lim et al.

(10) Patent No.: US 11,640,513 B2
(45) Date of Patent: May 2, 2023

(54) RFID SECURITY TAPE

(71) Applicant: Ascent Solutions Pte Ltd, Singapore (SG)

(72) Inventors: Chee Kean Lim, Singapore (SG); Kia Boon Chew, Singapore (SG); Xiaojing Wu, Singapore (SG); Huangwei Huang, Singapore (SG)

(73) Assignee: Ascent Solutions Pte Ltd, Singapore (SG)

( * ) Notice: Subject to any disclaimer, the term of this patent is extended or adjusted under 35 U.S.C. 154(b) by 115 days.

(21) Appl. No.: 17/256,552

(22) PCT Filed: Jun. 28, 2018

(86) PCT No.: PCT/SG2018/050317
§ 371 (c)(1),
(2) Date: Dec. 28, 2020

(87) PCT Pub. No.: WO2020/005153
PCT Pub. Date: Jan. 2, 2020

(65) Prior Publication Data
US 2021/0182644 A1 Jun. 17, 2021

(51) Int. Cl.
*G06K 19/077* (2006.01)
(52) U.S. Cl.
CPC ... *G06K 19/0776* (2013.01); *G06K 19/07722* (2013.01)
(58) Field of Classification Search
CPC ....... G06K 19/07722; G06K 19/07726; G06K 19/07798; G06K 19/0776; G09F 3/0335; G09F 3/00; G09F 3/02; G09F 3/0292; G09F 2003/0255; G09F 2003/0257; G09F 2003/0276; G09F 2003/0277

USPC ............... 235/488, 492; 340/572.1, 572.8
See application file for complete search history.

(56) References Cited

U.S. PATENT DOCUMENTS

| 7,102,522 B2 | 9/2006 | Kuhns |
| 8,427,316 B2 | 4/2013 | Bielas |
| 8,469,281 B2 | 6/2013 | Mieslinger |
| 2002/0135481 A1* | 9/2002 | Conwell ............ G08B 13/2448 340/568.1 |
| 2007/0138303 A1* | 6/2007 | Asakura ........... G06K 19/07749 235/492 |

(Continued)

FOREIGN PATENT DOCUMENTS

| JP | 2018013891 A * | 1/2018 |
| WO | 2002077939 A1 | 10/2002 |
| WO | 2020005153 A1 | 1/2020 |

OTHER PUBLICATIONS

Foreign Communication from a Related Counterpart Application, International Search Report and Written Opinion dated Aug. 29, 2018, International Application No. PCT/SG2018/050317 filed on Jun. 28, 2018.

*Primary Examiner* — Suezu Ellis

(57) ABSTRACT

An RFID security tape having: a layer of tamper-evident tape; a layer of an RFID inlay; a blocking layer; a layer of metal foil having an adhesive bottom surface; and a layer of a release liner, wherein all layers of the RFID security tape are in adhesive connection with each other and wherein the layer of the RFID inlay is configured to be damaged when the RFID security tape has been applied to an asset and the layer of tamper-evident tape is subsequently removed from the asset.

8 Claims, 2 Drawing Sheets

(56) References Cited

U.S. PATENT DOCUMENTS

| | | | |
|---|---|---|---|
| 2007/0252704 A1* | 11/2007 | Nagae | G06K 19/0776 340/572.8 |
| 2009/0021377 A1* | 1/2009 | Launiainen | G08B 13/2434 340/572.1 |
| 2010/0308965 A1* | 12/2010 | Weitzhandler | B60K 15/04 235/493 |
| 2014/0001270 A1 | 1/2014 | Kikuchi et al. | |
| 2016/0172742 A1 | 6/2016 | Forster | |

* cited by examiner

US 11,640,513 B2

RFID SECURITY TAPE

CROSS-REFERENCE TO RELATED APPLICATIONS

The present application is a filing under 35 U.S.C. 371 as the National Stage of International Application No. PCT/SG2018/050317, filed Jun. 28, 2018, entitled "RFID SECURITY TAPE," which is incorporated herein by reference in its entirety for all purposes.

FIELD OF THE INVENTION

This invention relates to an RFID security tape.

BACKGROUND OF THE INVENTION

Tamper-evident security tapes are used as tamper-evident devices to deter unauthorized access to protected assets. Currently available tamper-evident security tapes typically leave a visible residue on the asset when the security tape is peeled away from the asset to which the tamper-evident security tape has been applied. In this way, an intended recipient of the item would know that an unauthorized attempt to access the asset has been made if the asset arrives with the visible residue on it and the security tape is missing. In addition to providing tamper evidence, incorporating an RFID inlay with the tamper-evident security tape to form an RFID security tape allows an asset to which the RFID security tape is applied to also be automatically identified and tracked when the asset is within reading range of an RFID reader that emits a radio frequency to interrogate the RFID security tape on the asset. However, after a tamper-evident security tape (with or without RFID inlay) has been removed from an asset, it may still be possible to apply a new and apparently identical piece of tamper-evident security tape to the asset to hide any evidence of tampering. In this way, from visual inspection alone, it will not be possible to tell if an asset having an apparently intact tamper-evident security tape on it has actually been tampered with or not. For existing RFID security tapes, careful removal of the tamper-evident security tape also allows the RFID inlay to be reapplied using another piece of tamper-evident security tape so that no security breach would appear to have taken place when the RFID inlay is read by an RFID reader.

SUMMARY

According to a first aspect, there is provided an RFID security tape comprising: a layer of tamper-evident tape; a layer of an RFID inlay; a blocking layer; a layer of metal foil having an adhesive bottom surface; and a layer of a release liner, wherein all layers of the RFID security tape are in adhesive connection with each other and wherein the layer of the RFID inlay is configured to be damaged when the RFID security tape has been applied to an asset and the layer of tamper-evident tape is subsequently removed from the asset.

A bottom surface of the tamper-evident tape may be in adhesive connection with a top surface of the layer of the RFID inlay, a bottom surface of the layer of the RFID inlay may be in adhesive connection with a top surface of the blocking layer, a bottom surface of the blocking layer may be in adhesive connection with a top surface of the layer of metal foil, the adhesive bottom surface of the layer of metal foil may be in releasable adhesive connection with the release liner, and at least part of the tamper-evident tape may be in releasable adhesive connection with the release liner.

The RFID security tape may further comprise a first separation layer provided between the layer of tamper-evident tape and the layer of the RFID inlay, the first separation layer being in adhesive connection with the layer of tamper-evident tape and with the layer of the RFID inlay.

The first separation layer may be configured to tear and enhance damage to the RFID inlay when the RFID security tape has been applied to an asset and the layer of tamper-evident tape is subsequently removed from the asset.

The first separation layer may be made of a fibrous material.

The RFID security tape may further comprise a second separation layer provided between the first separation layer and the layer of the RFID inlay, the second separation layer being in adhesive connection with the first separation layer and with the layer of the RFID inlay.

The second separation layer may be made of a fibrous material.

The adhesive connection may be achieved by providing an adhesive layer between adjacent layers of the RFID security tape.

The blocking layer may be provided to prevent the metal foil from interfering with signals to and from the RFID inlay.

The blocking layer may be made of a polymeric foam.

The adhesive bottom surface of the layer of metal foil may be formed by providing a bottom adhesive layer on a bottom surface of the layer of metal foil.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of the RFID security tape will be described with reference to FIGS. 1 to 4.

Figure 1:
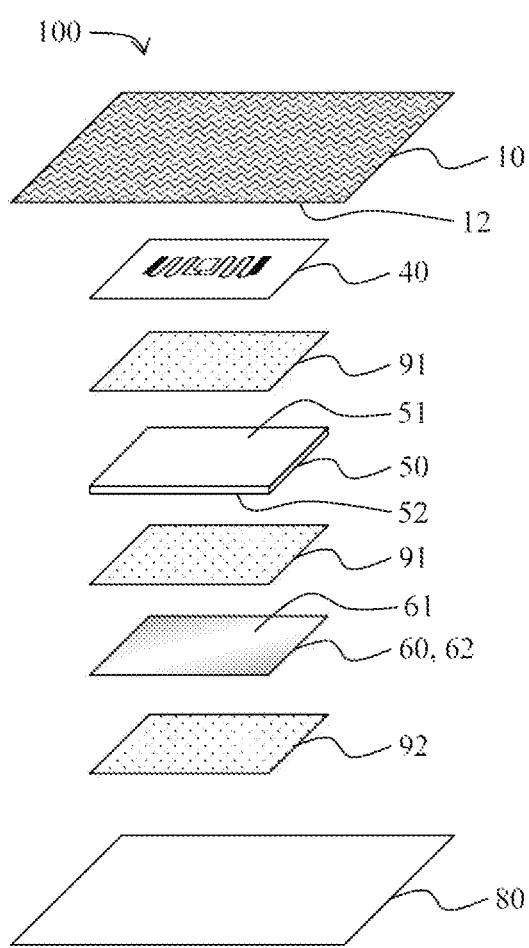
FIG. 1 is a schematic exploded assembly view of a first exemplary embodiment of an RFID security tape.

In general, as shown in a first exemplary embodiment in FIG. 1, the RFID security tape 100 (before application) comprises at least a layer of tamper-evident tape 10, a layer of an RFID inlay 40, a blocking layer 50, a layer of metal foil 60 having an adhesive bottom surface 62, and a layer of a release liner 80. All layers 10, 40, 50, 60, 80 of the RFID security tape 100 are in adhesive connection with each other. The phrase "adhesive connection" used in this application refers to two layers being connected to each other through use of one or more adhesives. The two layers in adhesive connection with each other may be adjacent layers (i.e. two layers that are in immediate side-by-side arrangement with each other) or may be two layers that are spaced apart from each other by one or more intervening layers therebetween. Adjacent layers may be in adhesive connection with each other by providing an appropriate adhesive layer 91 between the adjacent layers or by applying an appropriate adhesive (not shown) to at least one of the adjacent layers or by one of the adjacent layers (for example the layer of tamper-evident tape 10) already having an adhesive surface. Two layers that are spaced apart from each other by one or more intervening layers therebetween may also be in adhesive connection with each other as each intervening layer is adhered to at least one of the two layers and/or to another intervening layer. In this way, when the release liner 80 has been removed and the layer of metal foil 60 is adhered to the asset via its adhesive bottom surface 62, the remaining layers 10, 40, 50, of the RFID security tape 100 may also be said to be in adhesive connection with the asset.

In the first exemplary embodiment as shown in FIG. 1, a bottom surface 12 of the tamper-evident tape 10 is in adhesive connection with a top surface 41 of the RFID inlay 40. A bottom surface 42 of the RFID inlay 40 is in adhesive connection with a top surface 51 of the blocking layer 50. A bottom surface 52 of the blocking layer 50 is in adhesive connection with a top surface 61 of the layer of metal foil 60.

Before use, the adhesive bottom surface 62 of the layer of metal foil 60 is in releasable adhesive connection with the release liner 80 such that the release liner 80 may be readily removed from the RFID security tape 100 without damage to any parts of the RFID security tape 100. The adhesive bottom surface 62 of the layer of metal foil 60 may be formed by providing a bottom adhesive layer 92 on the bottom surface 62 of the layer of metal foil 60, or by applying an appropriate adhesive (not shown) to the bottom surface 62 of the layer of metal foil 60. The adhesive bottom surface 62 allows the RFID security tape 100 to be applied to an asset after the release liner 80 has been removed from the RFID security tape 100 to expose the adhesive bottom surface 62 of the layer of metal foil 60 which can then be adhered to the asset.

Figures 3, 4:
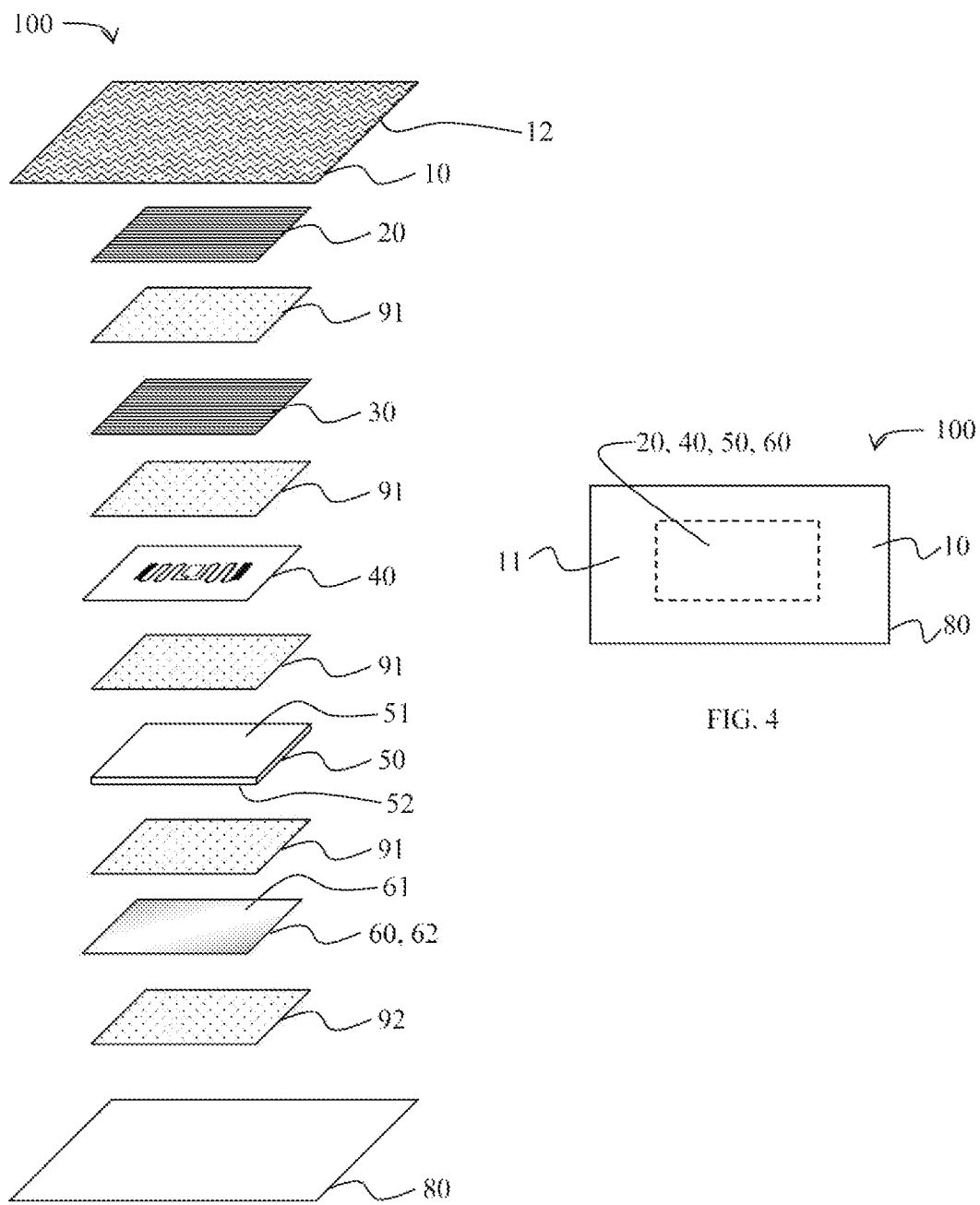
FIG. 3 is a schematic exploded assembly view of a further alternative exemplary embodiment of an RFID security tape.
FIG. 4 is a schematic top view of the RFID security tape of FIG. 1.

The layer of tamper-evident tape 10 may be of any currently available and appropriate form. Typically, the tamper-evident tape 10 is made of a plastics material having an adhesive underside. For example, the tamper-evident tape 10 may be of a form that leaves a visible residue on the asset when removed from the asset. The layer of tamper-evident tape 10 is preferably larger in size than all the other layers 40, 50, 60, 62, 91, 92 of the RFID security tape 100 except the release liner 80, so as to fully cover all the other components 40, 50, 60, 62, 91, 92 of the RFID security tape 100, as shown in FIG. 4. This is to allow at least part of the tamper-evident tape 10 (typically a perimeter area 11 of the tamper-evident tape 10) to also adhere to the asset and form a seal around all the other layers 40, 50, 60, 62, 91, 92 of the RFID security tape 100 when the RFID security tape 100 has been applied to the asset.

The RFID inlay 40 may be of any currently available and appropriate form. The RFID inlay 40 typically comprises an integrated circuit or microchip storing identifying information that is attached to an antenna comprising a small coil of metallic wire which transmits and receives radio frequency signals. The antenna and integrated circuit or microchip are typically encased in a plastics material. The RFID inlay 40 allows the asset to which the RFID security tape 100 has been applied to be automatically identified and tracked when the asset is within reading range of an RFID reader (not shown) that emits a radio frequency to interrogate the microchip in the RFID inlay 40.

The blocking layer 50 is configured to prevent the metal foil from interfering with signals to and from the RFID inlay. Accordingly, the blocking layer 50 comprises a signal insulating material and may be made of a polymeric foam such as ethylene-vinyl acetate foam, polyurethane foam, polyethylene foam, polyolefin foam and the like.

The layer of metal foil 60 is provided to serve as a reflector in order to allow the RFID inlay 40 to function when the RFID security tape 100 is applied to an asset having a metallic surface, such as an intermodal container (not shown). The layer of metal foil 60 may be made of aluminium or any other suitable metal.

The release liner 80 may be of any currently available and appropriate form, such as the backing paper provided with prior art tamper-evident security tapes. The release liner 80 should be at least the same size as or larger than the layer of tamper-evident tape 10 so that, before use of the RFID security tape 100, at least part of the tamper-evident tape 10 as well as the adhesive bottom surface 62 of the layer of metal foil 60 are in releasable adhesive connection with the release liner 80 such that no adhesive part of the RFID security tape 100 is exposed. This is to prevent inadvertent adherence of the RFID security tape 100 surrounding objects before application to an asset.

When the RFID security tape 100 has been applied to an asset, the layers 10, 40, 50, 60 of the RFID security tape 100 are in adhesive connection with the asset and the tamper-evident tape 10 forms an adhesive seal with the asset around all the other layers 40, 50, 60 of the RFID security tape 100. When it is subsequently attempted to remove the RFID security tape 100 from the asset by peeling the layer of the tamper-evident tape 10 from the asset, removing the layer of the tamper-evident tape 10 when the RFID security tape 100 has been applied to an asset results in shear and tensile forces being applied to the layer of the RFID inlay 40 as the layer of the tamper-evident tape 10 is peeled away from the layer of the RFID inlay 40 while being in adhesive connection with the layer of the RFID inlay 40 and while the layer of the RFID inlay 40 is in adhesive connection with the blocking layer 50. The shear and tensile forces that arise during removal of the tamper-evident tape 10 thus cause damage to the RFID inlay 40 due to plastic deformation of the plastics material in which the integrated circuit or microchip and antenna are encased. As the RFID inlay 40 is damaged and pulled away from the blocking layer 50 during removal of the layer of the tamper-evident tape 10, the blocking layer 50 is also expected to be damaged by tearing or breaking due to the RFID inlay 40 being in adhesive connection with the blocking layer 50.

Thus, attempting to remove the RFID security tape 100 from the asset by removing the layer of tamper-evident tape 10 from the asset results in obvious damage to the RFID security tape 100. The obvious damage serves as a visual indication of security breach of the asset. Damage of the RFID inlay 40 also means that the RFID inlay 40 can no longer continue receiving and transmitting radio frequency signals. Loss of signal from the RFID inlay 40 serves as an additional indication that security of the asset has been breached.

Figure 2:
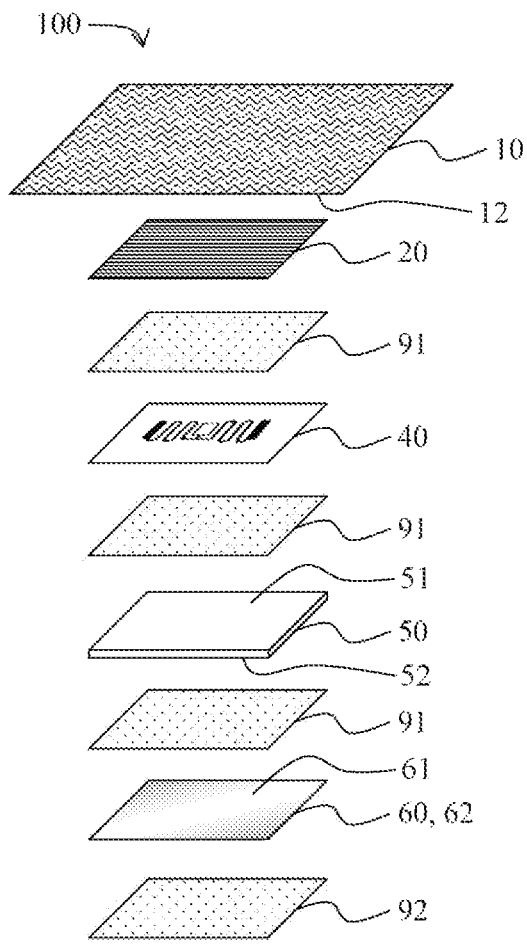
FIG. 2 is a schematic exploded assembly view of an alternative exemplary embodiment of an RFID security tape.

In an alternative embodiment of the RFID security tape 100 as shown in FIG. 2, the RFID security tape 100 further comprises a first separation layer 20 provided between the layer of tamper-evident tape 10 and the layer of the RFID inlay 40. The first separation layer 20 is in adhesive connection with the layer of tamper-evident tape 10 and also with the layer of the RFID inlay 40. The first separation layer 20 is provided to enhance damage to the RFID inlay 40 when the layer of tamper-evident tape 10 is removed from the asset. This is achieved by configuring the first separation layer 20 to tear when the RFID security tape 100 has been applied to an asset and the layer of tamper-evident tape 10 is subsequently peeled away from the asset. The first separation layer 20 should thus be made of a material suitable for preventing the tamper-evident tape 10 from being separated from the first separation layer 20 without tearing the first separation layer 20. Accordingly, the first separation layer 20 may be made of any appropriate fibrous material such as paper, cardstock, paperboard, woven fabric, non-woven fabric and the like that will tear when the tamper-evident tape 10 is peeled away from the asset and separated from the first separation layer 20 while the rest of the RFID security tape 100 is in adhesive connection with the asset. Tearing of the first separation layer 20 also increases obviousness of the visible damage to the RFID security tape 10, thereby enhancing visual indication of any security breach of the asset.

In a further alternative exemplary embodiment of the RFID security tape 100 as shown in FIG. 3, a second separation layer 30 may be provided between the first separation layer 20 and the layer of the RFID inlay 40. The second separation layer 30 is in adhesive connection with the first separation layer 20 and also with the layer of the RFID inlay 40. The second separation layer 30 is provided and made of a material to further enhance damage of the RFID inlay 40 when the tamper-evident tape 10 is separated from the first separation layer 20 after the RFID security tape 100 has been applied to an asset. Accordingly, the second separation layer 30 may be made of any suitable fibrous material such as paper, cardstock, paperboard, woven fabric, non-woven fabric and the like. The second separation layer 30 may or may not be made of the same material as the first separation layer 20.

Whilst there has been described in the foregoing description exemplary embodiments of the present invention, it will be understood by those skilled in the technology concerned that many variations in details of design, construction and/or operation may be made without departing from the present invention.

The invention claimed is:

1. A radio frequency identification (RFID) security tape comprising:
   a layer of tamper-evident tape;
   a layer of an RFID inlay;
   a blocking layer;
   a layer of metal foil having an adhesive bottom surface; and
   a layer of a release liner,
   wherein all layers of the RFID security tape are in adhesive connection with each other and wherein the layer of the RFID inlay is configured to be damaged when the RFID security tape has been applied to an asset and the layer of tamper-evident tape is subsequently removed from the asset;
   the RFID security tape further comprising a first separation layer provided between the layer of tamper-evident tape and the layer of the RFID inlay, the first separation layer being in adhesive connection with the layer of tamper-evident tape and with the layer of the RFID inlay, wherein the first separation layer is made of a fibrous material that will tear and thereby enhance damage to the RFID inlay when the RFID security tape has been applied to an asset and the layer of tamper-evident tape is subsequently removed from the asset.

2. The RFID security tape of claim 1, wherein a bottom surface of the tamper-evident tape is in adhesive connection with a top surface of the layer of the RFID inlay, a bottom surface of the layer of the RFID inlay is in adhesive connection with a top surface of the blocking layer, a bottom surface of the blocking layer is in adhesive connection with a top surface of the layer of metal foil, the adhesive bottom surface of the layer of metal foil is in releasable adhesive connection with the release liner, and at least part of the tamper-evident tape is in releasable adhesive connection with the release liner.

3. The RFID security tape of claim 1, further comprising a second separation layer provided between the first separation layer and the layer of the RFID inlay, the second separation layer being in adhesive connection with the first separation layer and with the layer of the RFID inlay.

4. The RFID security tape of claim 3, wherein the second separation layer is made of a fibrous material.

5. The RFID security tape of claim 4, wherein the blocking layer is made of a polymeric foam.

6. The RFID security tape of claim 1, wherein the adhesive connection is achieved by providing an adhesive layer between adjacent layers of the RFID security tape.

7. The RFID security tape of claim 1, wherein the blocking layer is provided to prevent the metal foil from interfering with signals to and from the RFID inlay.

8. The RFID security tape of claim 1, wherein the adhesive bottom surface of the layer of metal foil is formed by providing a bottom adhesive layer on a bottom surface of the layer of metal foil.

* * * * *